June 30, 1964  T. Z. WHITE ETAL  3,139,073
COOLING SYSTEM
Original Filed April 29, 1960
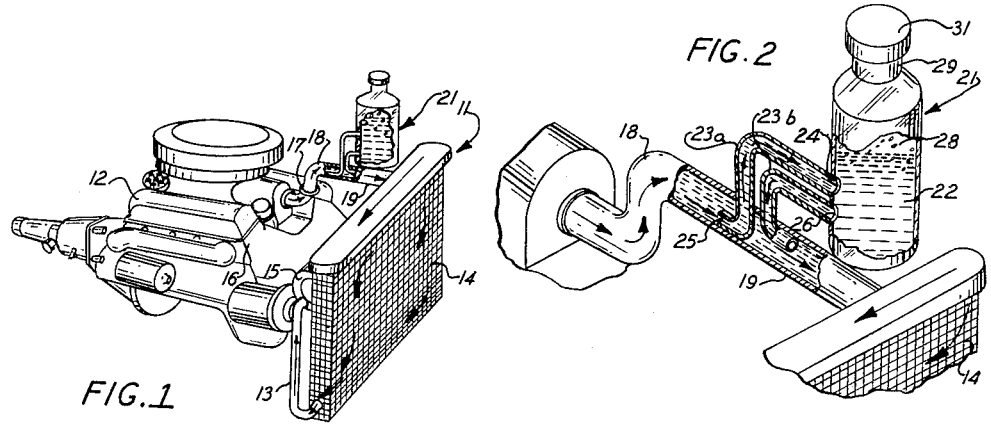
FIG. 1
FIG. 2
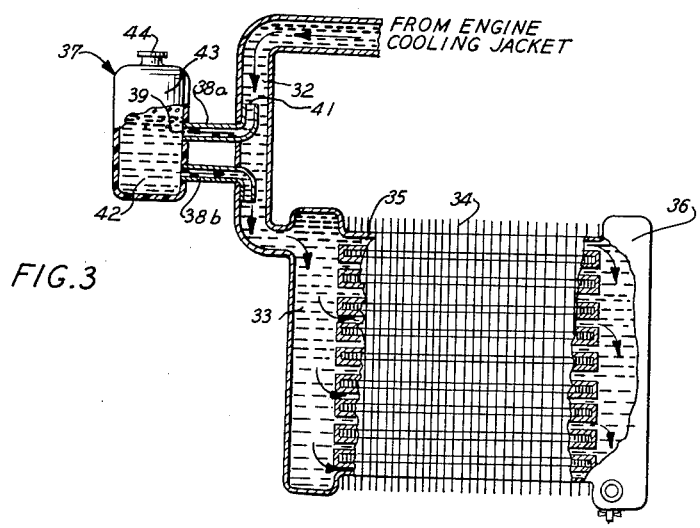
FIG. 3
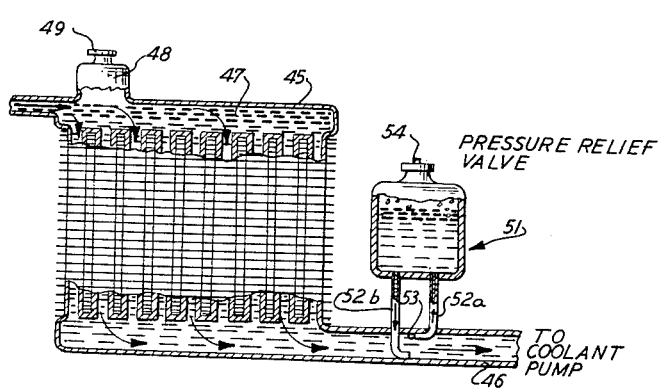
FIG. 4
THEODORE Z. WHITE
ROBERT M. THORPE
INVENTORS
BY John C. Faulkner
Thomas H. Oster
ATTORNEYS United States Patent Office 3,139,073
Patented June 30, 1964

3,139,073
COOLING SYSTEM
Theodore Z. White, Dearborn Township, Wayne County, Mich., and Robert M. Thorpe, Lake Worth, Fla., assignors to Ford Motor Company, Dearborn, Mich., a corporation of Delaware
Original application Apr. 29, 1960, Ser. No. 25,684, now Patent No. 3,051,450, dated Aug. 28, 1962. Divided and this application June 11, 1962, Ser. No. 201,382
9 Claims. (Cl. 123—41.29)

This invention pertains to automotive cooling systems and more particularly to a cooling system for a liquid cooled internal combustion engine in which a means for separating gas from the liquid coolant is provided.

This application is a division of our copending application Serial No. 25,684, filed April 29, 1960, now U.S. Patent No. 3,051,450.

With the advent of automotive cooling systems which remain sealed for a long period of time or for the life of the car by the utilization of a factory-installed "permanent" liquid coolant in the system, it has become necessary to maintain the liquid coolant and the cooling system proper in optimum operating condition. A prime requisite in achieving this condition is the removal of gas entrapped in the liquid coolant circulating in the automotive cooling system.

Coolants having entrained air bubbles are inefficient since air has poor heat conducting properties. Gas or air contamination of the coolant may cause pump cavitation, increased rust formation and corrosion, or result in foaming and overheating. All or any one of these factors will substantially reduce the efficiency and increase the need of maintenance of the cooling system.

To remove all or most of the gas from the coolant, a gas separator means is associated with the automotive cooling system of this invention. The gas separator means is placed in communication with the flow path of the coolant through the cooling system by a pair of bypass conduits. One of the bypass conduits diverts a portion of the liquid coolant entrained with gas into the gas separating means. A second of the bypass conduits returns the diverted portion of the liquid coolant from which the gas has been separated to the flow path. The entrapped gas accumulates in the upper portion of the gas separating means from whence it may be exhausted to the atmosphere.

It is an object of this invention to improve the efficiency of cooling systems for internal combustion engines by the removal of gas entrapped in the coolant. A further object is to provide a gas separating means which will separate and accumulate air and other gases from the coolant during the operation of the automotive cooling system.

Further objects and advantages of this invention will become more apparent when viewed in connection with the figures of the drawing in which:

FIGURE 1 is a diagrammatic view in perspective of an internal combustion engine and its associated cooling system, incorporating an air separator shown partially in section;

FIGURE 2 is an enlarged perspective view, partially in section, of the air separator shown in FIGURE 1;

FIGURE 3 is a schematic elevational view of a portion of an automotive cooling system of an embodiment of this invention in which an expansible air separator, shown partially in section, is positioned on the intake side of a cross flow radiator; and, FIGURE 4 is a schematic elevational view of a portion of an automotive cooling system depicting an embodiment of this invention in which an air separator, shown partially in section, is positioned on the exhaust side of a downflow radiator.

In FIGURE 1 is seen a cooling system, generally designated at 11, for an internal combustion engine 12. Liquid coolant for the engine is circulated through a first conduit 13 connecting the lower portion of a conventional radiator 14 with a coolant pump 15. The coolant pump 15 is mounted on the front of the engine 12 with its discharge end communicating with an engine cooling jacket 16. A second conduit 17 connects the engine cooling jacket 16 with the upper portion of the radiator 14 to convey the warm liquid coolant back to the radiator 14 for cooling.

The second conduit 17, in this instance, extends upwardly from the engine cooling jacket 16 and then is bent at elbow 18 before continuing as a generally longitudinally extending conduit portion 19 which is substantially at the same level as the top of the radiator 14. An air separator 21 is positioned above the generally longitudinally extending conduit portion 19. The air separator 21 best seen in FIGURE 2 has its lower portion 22 placed in communication with the conduit portion 19 by a pair of bypass conduits 23.

The first bypass conduit 23a has a discharge opening 24 at the side of the air separator 21 and an intake opening 25 within the lower part of the longitudinally extending conduit portion 19. The intake opening 25 faces against the direction of coolant flow which is indicated by the arrows in the drawing. The second bypass conduit 23b has an intake opening 26 at the side of the air separator 21 and a discharge opening 27 within the generally longitudinally extending conduit portion 19 of the second conduit 17.

The air separator 21 has an upper portion 28 from which a filling neck 29 extends upwardly. The filling neck 29 is provided with a closure member 31 which may be manually removed to bleed accumulated air from the air separator 21 and also to permit filling the cooling system 11 with liquid coolant to its optimum coolant level. The air separator 21 may be formed from a clear material so as to facilitate the checking of the coolant level of the cooling system if desired. The cross sectional area of the first bypass conduit 23a is relatively small in comparison to the cross sectional area of the second conduit 17 to assure that only a portion of the coolant flow will be diverted into the lower portion 22 of the air separator 21.

It can be seen from FIGURE 2 that the intake opening 25 of the first bypass conduit 23a is in communication with the coolant flow path adjacent to and downstream of the elbow 18 so as to take advantage of the combined effect of gravity and centrifugal action resulting from the high velocity coolant flow through the elbow 18. This will assure that the liquid coolant with a relative high percentage of air entrained in it will be diverted into the air separator 21 to effect the optimum separation of air from the liquid coolant.

In FIGURE 3 is seen a portion of an automotive cooling system of a further embodiment of this invention. An intake conduit 32 places the engine cooling jacket in communication with a vertical header tank 33 of a cross flow radiator 34. The coolant flows through the cross flow radiator tubes 35 to a second vertical header tank 36 from whence it is returned to the internal combustion engine. An air separating chamber 37 is placed in communication with the intake conduit 32 by a pair of bypass conduits 38. At one end of the first bypass conduit 38a is a discharge opening 39 in one side of the air separating chamber 37. At the other end of the first bypass conduit 38a is an intake opening 41 which is wholly contained within the conduit 32 and faces in a direction opposite of the coolant flow. The diameter of the first bypass conduit 38a is smaller than the diameter of the intake conduit 32 so that only a portion of the coolant entrained with air will be diverted into the air separating chamber 37. A second bypass conduit 38b places the air separating chamber 37 in communication with the conduit 32 downstream from the intake opening 41 of the first bypass conduit 38a.

The air separating chamber 37 has a lower portion 42 which is filled with liquid coolant during the operation of the cooling system and an upper portion 43 in which air separated from the diverted coolant is accumulated. The upper portion 43 has a bleeder cap 44 to permit the exhaust of accumulated air from the air separating chamber 37.

As the air separating chamber 37 may also serve as an expansion chamber, it may be fabricated from an expansible material as seen in FIGURE 3 to allow for the expansion of coolant in a sealed cooling system. In such an instance, the cap 44 does not serve as a bleeder cap since the air separated from the coolant is retained in the air separating chamber 37. The chamber 37 as shown in FIGURE 3 is designed to expand in order to accommodate the air accumulated therein. The cap 44, though, may still be utilized as a filler cap to permit refilling the cooling system when required.

In FIGURE 4 is seen a portion of an automotive cooling system in the third embodiment of this invention comprising a downflow radiator 45 and an outlet conduit 46 to convey the cooled coolant from the radiator 45 back to the coolant pump. At the top of the downflow radiator 45 is a horizontal header tank 47 which is provided with a filler neck 48. A removable closure member 49 is placed on the filler neck to permit the filling of the cooling system with coolant and also to allow removal of any air entrapped in the header tank 47.

The bottom of an air separating chamber 51 is placed in communication with the outlet conduit 46 by a pair of bypass conduits 52. The first bypass conduit 52a has an intake opening 53 which is placed in the top portion of the outlet conduit 46 to divert coolant with a high percentage of air entrained in it to the air separating chamber 51. As air has a tendency to rise to the top when the coolant flows in a nonturbulent horizontal path, it is desirable to place the intake opening 53 close to the top within the outlet conduit 46. The second bypass conduit 52b returns the diverted coolant from the air separating chamber 51 to the outlet conduit 46 of the cooling system.

A pressure relief valve 54 is provided at the top of the air separating chamber 51 to permit bleeding of accumulated air separated from the coolant when a predetermined pressure in the cooling system is exceeded.

As can be seen from the foregoing description, the various embodiments of the cooling systems of this invention are provided with gas separating means to separate entrained gas such as air from the coolant circulating in the cooling system. Coolant entrapped with gas is diverted from the flow path into the gas separating means by a first bypass conduit. The intake opening of the first bypass conduit faces against the direction of normal coolant flow to take advantage of the ram effect of the high velocity coolant pumped through the cooling system. As it is advantageous to divert the portion of the coolant with the largest amount of gas entrapped therein, the intake opening of the bypass conduit is positioned in the flow path of the cooling system at a point which permits the maximum utilization of gravity and/or centrifugal action to assist in the separation of the gas and the coolant.

As the flow of diverted coolant entrained with gas through a separating chamber has a relatively low velocity with respect to the flow in the conduit of the cooling system, the entrained gas, which has a lower specific gravity than the liquid coolant, will readily separate and accumulate in the upper portion of the gas separating chamber. After the gas is separated from the diverted coolant, the coolant is returned to the flow path through a second bypass conduit.

The gas separating chamber may be provided with a means to vent the accumulated gas from the cooling system.

If the gas separating chamber is installed in the upper part of the cooling system, a means for filling the cooling system through the separator may also be provided. The closure member for this filling means may also serve simultaneously as a bleeder for the gas accumulated in the separating chamber when the closure member is removed in order to perform the filling operation.

As the separating chamber may also be used as an expansion chamber or reservoir, it may be fabricated from an expansible material. The use of clear material such as glass or plastic for the separating chamber may also assist in checking the coolant level of the cooling system without requiring the removal of the closure member.

It will be understood that the invention is not to be limited to the exact construction shown and described but that various changes and modifications may be made without departing from the spirit and scope of the invention as defined in the appended claims.

We claim:

1. An improved cooling system for a liquid cooled internal combustion engine, said cooling system comprising a cooling jacket, a coolant pump, a radiator, and a first conduit connecting one portion of said radiator with said coolant pump and said cooling jacket in series, and a second conduit connecting said cooling jacket with another portion of said radiator, one of said conduits being associated with an air separator, said air separator and one of said conduit means being connected by a first and second bypass conduit, the first bypass conduit having an opening within one of said conduits and a second opening in the lower portion of said air separator, the first opening being smaller in cross sectional area than said cross sectional area of said one of said conduits and facing in the direction against the flow of the coolant, said second bypass placing the lower portion of said air separator in communication with one of said conduits to convey coolant back to said one of said conduits, and means on the upper portion of said air separator for venting entrapped air to the atmosphere.

2. The apparatus as described in claim 1 and which is further characterized in that said first opening being positioned within said one of the conduit means where a portion of liquid coolant has a high percentage of air entrapped therein.

3. An improved cooling system for a liquid cooled internal combustion engine, said cooling system comprising a cooling jacket, a coolant pump, a radiator, and a first conduit connecting one portion of said radiator with said coolant pump and said cooling jacket in series, and a second conduit connecting said cooling jacket with another portion of said radiator, said first conduit having an interconnected generally extending vertical portion, an elbow, a generally horizontally extending portion, said first conduit being associated with an air separator, said generally horizontally extending portion of said first conduit and said air separator being connected by a pair of bypass conduits, the first of said pair of bypass conduits having a first opening in the lower portion of said horizontally extending portion of the first conduit adjacent said elbow, a second opening in the lower portion of said air separator, said first opening being smaller in cross sectional area than the cross sectional area of said horizontally extending portion of said first conduit and facing in a direction against the flow of coolant, the second of said pair of bypass conduits being arranged to convey coolant back from the lower portion of said air separator to one of said conduits, and means on the upper portion of said air separator for venting entrapped air accumulated in the air separator to the atmosphere.

4. An improved cooling system for a liquid cooled internal combustion engine, said cooling system comprising a cooling jacket, a coolant pump, coolant cooling means and conduit means intermediate the cooling jacket and the coolant cooling means to establish a coolant flow path, gas separating means mounted in parallel with said conduit means and connected thereto by a pair of bypass conduits, said gas separating means being partially filled with coolant, the first of said pair of bypass conduits being arranged to convey coolant having a relatively low percentage of gas entrapped therein from said conduit means into said gas separating means below its coolant level, and the second of said pair of bypass conduits being arranged to convey coolant back from said gas separating means to said conduit means downstream from said first of said pair of bypass conduits.

5. The improved cooling system as described in claim 4 and which is further characterized in that said gas separating means is a chamber constructed from an expansible material to allow for the expansion of the chamber upon the accumulation of separated gas therein.

6. The improved cooling system as described in claim 4 and which is further characterized in that said gas separating means is provided with a means above the coolant level to vent separated gas to the atmosphere.

7. An improved cooling system for a liquid cooled internal combustion engine, said cooling system comprising a cooling jacket, a coolant pump, and a radiator, a first conduit means connecting one portion of said radiator with said coolant pump and said cooling jacket in series, a second conduit means connecting said cooling jacket to another portion of said radiator, a gas separator mounted in parallel with one of said conduit means and connected thereto by a pair of bypass conduits, the lower portion of said gas separator filled with coolant, the first of said bypass conduits being arranged to divert a portion of coolant having a relatively low percentage of gas entrapped therein from said one of the conduits into the lower portion of said gas separator, a second of said pair of bypass conduits being arranged to return said diverted portion of the coolant into said one of the conduit means downstream from said first of the pair of bypass conduits, and means on the upper portion of said gas separator for venting gas to the atmosphere.

8. An improved cooling system for a liquid cooled internal combustion engine, said cooling system comprising a cooling jacket, a coolant pump, a radiator, a first conduit connecting the lower portion of said radiator with said pump, said cooling pump and said cooling jacket being in series, and a second conduit connecting said cooling jacket with the upper portion of said radiator, an air separator mounted in parallel with said second conduit and connected thereto by a pair of bypass conduits, the first of said pair of bypass conduits being arranged to divert coolant having a relatively low percentage of air entrapped therein from its flow path in said second conduit into the lower portion of said air separator, said lower portion being filled with coolant, the second of said pair of bypass conduits being arranged to convey said diverted coolant back from the lower portion of said air separator into said second conduit at a point downstream from said first of said pair of bypass conduits, and means on the upper portion of said air separator for discharging the air separated from said coolant to the atmosphere.

9. The improved cooling system as described in claim 8 and which is further characterized in that said means on the upper portion of said air separator is a pressure relief means to bleed separated air from said air separator when the pessure in said cooling system exceeds a predetermined value.

References Cited in the file of this patent
UNITED STATES PATENTS
2,147,993    Schiebe _____ Feb. 21, 1959